(12) United States Patent
Worthington

(10) Patent No.: US 8,145,529 B2
(45) Date of Patent: Mar. 27, 2012

(54) SYSTEM FOR A MULTI-MEDIA TOOL BAR WITH ADVERTISEMENTS

(75) Inventor: Cristian Alfred Worthington, Vancouver (CA)

(73) Assignee: i-fax.com Inc., Vancouver (CA)

( * ) Notice: Subject to any disclaimer, the term of this patent is extended or adjusted under 35 U.S.C. 154(b) by 132 days.

(21) Appl. No.: 12/209,427

(22) Filed: Sep. 12, 2008

(65) Prior Publication Data
US 2009/0076963 A1    Mar. 19, 2009

Related U.S. Application Data

(60) Provisional application No. 60/972,361, filed on Sep. 14, 2007.

(51) Int. Cl.
*G06Q 10/00* (2012.01)
(52) U.S. Cl. ........... 705/14.52; 705/51; 705/55; 705/56; 705/57; 705/50; 705/14.4; 705/14.42; 705/14.49; 725/32
(58) Field of Classification Search ............ 705/50
See application file for complete search history.

(56) References Cited

U.S. PATENT DOCUMENTS

| | | |
|---|---|---|
| 5,796,952 A | 8/1998 | Davis et al. |
| 5,813,007 A | 9/1998 | Nielsen |
| 5,999,912 A | 12/1999 | Wodarz et al. |
| 6,026,429 A | 2/2000 | Jones et al. |

(Continued)

FOREIGN PATENT DOCUMENTS
CA    2564735 A1    11/2005
(Continued)

OTHER PUBLICATIONS

How the Internet Works. Gralla, Preston. Que Publishing, Indianapolis, IN, 2001. ISBN 0-7897-2582-7. Chapters 1-4, 22, Glossary, Index, front and back matter included.*

(Continued)

*Primary Examiner* — James A Reagan
(74) *Attorney, Agent, or Firm* — Oyen Wiggs Green & Mutala LLP; Bruce M. Green

(57) ABSTRACT

A system comprised of a Tool Bar equipped with the ability to: a) encrypt emails that are sent to computer users who must download and maintain a copy of the Tool Bar to receive the encryption keys needed to decrypt emails; b) display Advertisements in an area of the Tool Bar designed to support text, graphics and video advertisements; c) display various multimedia sessions that allow the user to watch Internet videos, listen to Internet music, read RSS content and engage in other Internet media applications; d) carry out a process by which the computer user can install the Tool Bar in a number of computer applications. e) carry out a process by which the video, radio and RSS functions of the Tool Bar can be continuously viewed as the user moves between software applications.

13 Claims, 5 Drawing Sheets

U.S. PATENT DOCUMENTS

| | | | |
|---|---|---|---|
| 6,175,862 B1 | 1/2001 | Chen et al. | |
| 6,243,725 B1 | 6/2001 | Hempleman et al. | |
| 6,248,946 B1* | 6/2001 | Dwek | 84/609 |
| 6,427,175 B1 | 7/2002 | Khan et al. | |
| 6,763,345 B1 | 7/2004 | Hempleman et al. | |
| 7,058,892 B1 | 6/2006 | MacNaughton et al. | |
| 7,562,287 B1 | 7/2009 | Goldstein et al. | |
| 7,593,868 B2* | 9/2009 | Margiloff et al. | 705/26 |
| 2001/0010046 A1 | 7/2001 | Muyres et al. | |
| 2001/0018858 A1* | 9/2001 | Dwek | 84/609 |
| 2001/0047384 A1 | 11/2001 | Croy | |
| 2002/0091762 A1 | 7/2002 | Sohn et al. | |
| 2004/0049737 A1 | 3/2004 | Simon Hunt et al. | |
| 2004/0205448 A1 | 10/2004 | Grefenstette et al. | |
| 2004/0268261 A1 | 12/2004 | Elliott et al. | |
| 2006/0112341 A1* | 5/2006 | Shafron | 715/733 |
| 2006/0129937 A1* | 6/2006 | Shafron | 715/733 |
| 2006/0161863 A1 | 7/2006 | Gallo | |
| 2006/0190561 A1 | 8/2006 | Conboy et al. | |
| 2006/0230156 A1 | 10/2006 | Shappir et al. | |
| 2006/0253794 A1* | 11/2006 | Wilson | 715/779 |
| 2007/0033269 A1* | 2/2007 | Atkinson et al. | 709/219 |
| 2007/0112627 A1* | 5/2007 | Jacobs et al. | 705/14 |
| 2008/0028474 A1 | 1/2008 | Horne et al. | |
| 2008/0109785 A1 | 5/2008 | Bailey | |
| 2008/0183534 A1* | 7/2008 | Joo | 705/7 |
| 2009/0132942 A1 | 5/2009 | Santoro et al. | |
| 2009/0254529 A1 | 10/2009 | Goldentouch | |
| 2010/0185513 A1* | 7/2010 | Anderson et al. | 705/14.49 |

FOREIGN PATENT DOCUMENTS

| | | |
|---|---|---|
| WO | 2009055692 A2 | 4/2009 |
| WO | WO 2009055692 A2 * | 4/2009 |

OTHER PUBLICATIONS

"FTC Alert on InternetALERT". Kuchinskas, Susan. InternetNews.com, Sep. 3, 2003. Available from <www.internetnews.com/ec-news/article.php/3403961>.*

"Five Major Categories of Spyware". Barrett, Robertson. Consumer-Reports WebWatch, Oct. 21, 2002. Available from <http://www.consumerwebwatch.org/dynamic/privacy-investigations-categories-spy.cfm>.*

Internet Archive Wayback Machine, archive of "Common Gateway Interface". Archived at <http://web.archive.org/web/20010410030952/hoohoo.ncsa.uiuc.edu/cgi/intro.html>. Archived Apr. 10, 2001.*

"Bibirmer Extension for Firefox, Internet Explorer". Available from <http://www.bibirmer.com/Extensions/>.*

How the Internet Works. Gralla, Preston. Que Publishing, Indianapolis, IN, 2001. ISBN 0-7897-2582-7. Chapters 1-4, 22, Glossary, Index, front and back matter included. © 2002.*

* cited by examiner

SYSTEM FOR A MULTI-MEDIA TOOL BAR WITH ADVERTISEMENTS

CROSS REFERENCE TO RELATED APPLICATION

The present application claims the benefits, under 35 U.S.C. §119(e), of U.S. Provisional Application Ser. No. 60/972,361 filed Sep. 14, 2007 which is incorporated herein by this reference.

TECHNICAL FIELD

The invention relates to the field of graphic user interfaces for computer programs.

BACKGROUND

A Tool Bar is a horizontal or vertical sequence of icons, buttons or task panes on a computer screen some or all of which execute a command when clicked by the user's cursor. Most Tool Bars are used to display functions that are useful to a specific software application. The term "Tool Bar" is used herein to refer to any such functional bar display or equivalents including toolbars, status bars, button bars, menu bars, address bars and task bars.

Tool Bars are generally provided or distributed to computer users in the following ways:

i) The manufacturer of a software application includes the Tool Bar in a distribution of the software. For example, Microsoft Word™ has a "Draw" Tool Bar that is included with Microsoft Word. This Tool Bar displays short cuts to functions useful when drawing a diagram.

ii) Third parties wishing to include functionalities that drive users to a specific service or software application distribute Tool Bars directly to the users, such as by downloads off the Internet.

These Tool Bars are often advertised on a web site and are downloaded by users wishing to benefit from the features offered by the Tool Bar. For example, Google distributes a "Search" Tool Bar that allows users to conduct Google searches without first going to the Google website.

In each of these scenarios, the user must:

i) Deliberately install the Tool Bar in order to have access to the functions displayed in the Tool Bar. The user must seek out the Tool Bar and either activate it (as in Microsoft Word's "Draw" Tool Bar) or install it (as in Google's "Search" Tool Bar); and ii) Continue to use the Tool Bar. If the user uninstalls the Tool Bar, the Tool Bar ceases to be visible to the user. Additionally, most Tool Bars do not provide a revenue opportunity for the Tool Bar provider in the form of advertisements in the Tool Bar.

While it has been known to include advertising in Tool Bars, there is a problem with the existing approach. If a Tool Bar contains an advertising medium, such as text or video advertisements, the financial effectiveness of the Tool Bar is minimized if the user a) fails to adopt the use of the Tool Bar; or b) uninstalls the Tool Bar after if has been adopted.

With respect to a user's failure to adopt a Tool Bar, the rate at which users adopt conventional Tool Bars is limited by a process that depends upon the user. The user must become aware of the Tool Bar's existence by seeking out the functionality or encountering the Tool Bar on a website. In effect, a marketing process must be used to create user awareness or the user must play an active role in the discovery of the Tool Bar. Or a user may deliberately activate a function embedded in an existing software application (e.g. the "Draw" Tool Bar in Microsoft Word) or download and install a Tool Bar (e.g. the "Search" Tool Bar provided by Google). In effect, the user must make a value judgment based upon the perceived benefits of the Tool Bar's functionality and install the Tool Bar. Consequently, the vast majority of computer users only use Tool Bars provided by the major software suppliers in the computer industry, who either have a large installed base of users or have the marketing presence to create awareness.

With respect to uninstalled Tool Bars, conventional Tool Bars are easily uninstalled and the consequences are limited to a temporary loss of functionality, as the user can always reinstall the Tool Bar in the future. Additionally, a user switching from Google's "Search" Tool Bar to Yahoo's "Search" Tool Bar does not experience a net loss of functionality. In the existing software and marketing industry, Tool Bars have a transient user base. Users can uninstall Tool Bars without ongoing consequences. If a Tool Bar containing advertisements that display on the computer user's desktop is uninstalled, the revenue stream gained from those advertisements is lost. A loss of a Tool Bar user results in a loss of advertising revenue.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

The present invention therefore provides a method of generating advertising revenue from advertisements displayed on users' computers, each user's computer having a computer display able to provide a graphical user interface and being accessible to the Internet, the method comprising: i) pushing a tool bar to the user's interface by an action that is not initiated by the user; and ii) providing an incentive to maintain the tool bar on the user's interface; wherein said tool bar is adapted to communicate advertisements. The invention also provides a computer readable storage medium having program code stored thereon, wherein the program code, when executed by a computer, performs the foregoing method.

The present invention thus solves the foregoing problems by providing a system that will: a) cause computer users to learn about a tool bar's existence passively by having the tool bar pushed to the user's desktop by an action that is not initiated by the user or by a marketing process, such as receipt of an email; b) create an incentive to maintain the tool bar on the desktop on an ongoing basis, such as a continuing use of an email service; and c) provide users with a tool bar that supports a functionality that causes users to accept the presence of advertisements embedded in the Tool Bar and encourages users to install the tool bar in multiple software applications on the desktop, such as multi-media information and entertainment services.

The present invention provides a system comprised of a Tool Bar equipped with the ability to: a) encrypt emails that are sent to computer users who must download and maintain a copy of the Tool Bar to receive the encryption keys needed to decrypt emails; b) display advertisements in an area of the Tool Bar designed to support text, graphics and video advertisements; c) display various multi-media sessions that allow the user to watch Internet videos, listen to Internet music, read RSS content and engage in other Internet media applications.

The present invention further provides a process by which the computer user can install the Tool Bar in a number of computer applications, and a process by which the video, radio and RSS functions of the Tool Bar can be continuously viewed as the user moves between software applications.

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Where the term "computer display" is used herein it is understood that such includes an electronic display for any information processing device which can send and receive electronic mail, including computers, desk-top computers, computer servers, laptop computers, notebook computers, palm-top computers, mobile devices, personal digital assistants, cellphones, mobile phones, Blackberries, smartphones, pagers and the like.

Figure 1:
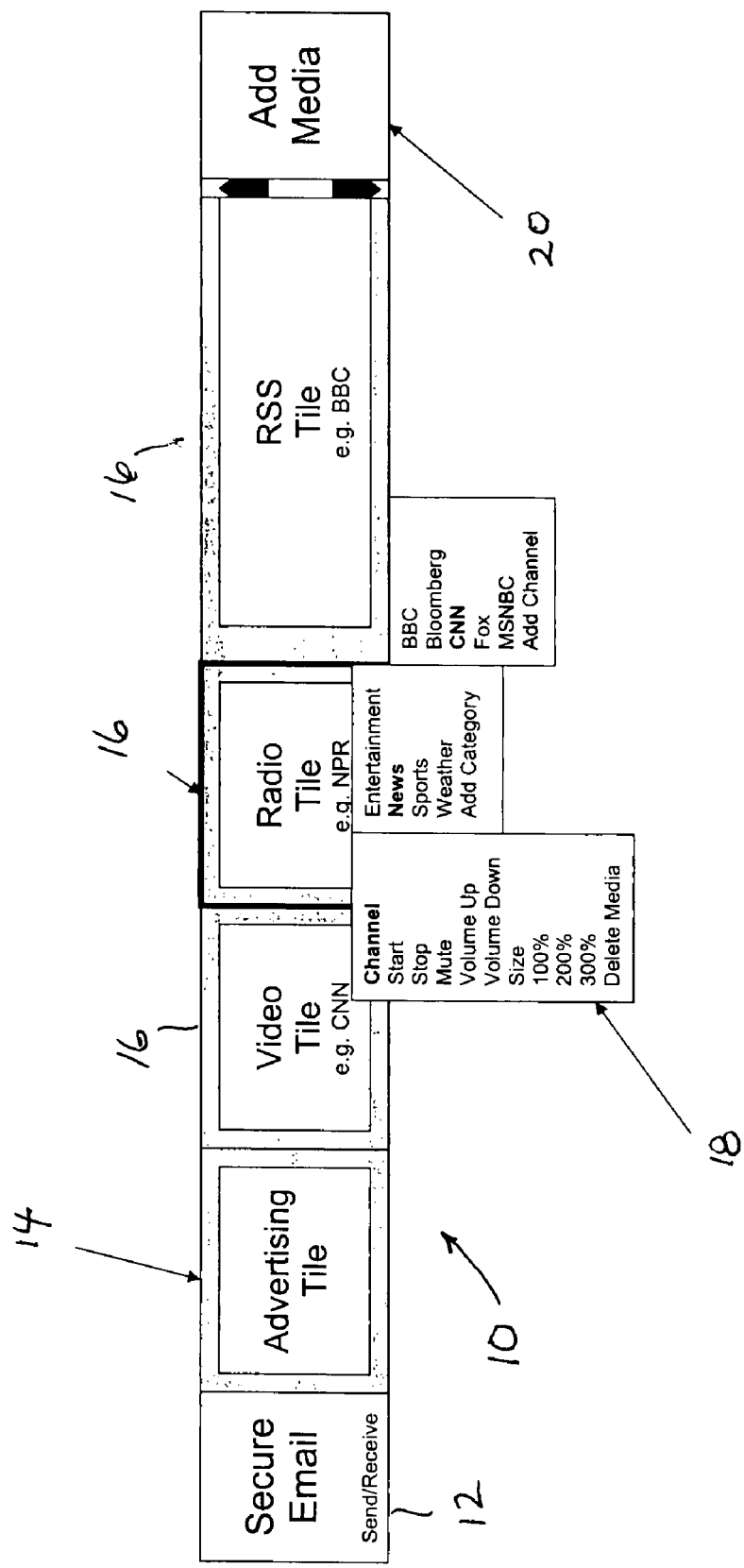
FIG. 1 is a schematic diagram illustrating a Tool Bar Layout according to the invention.

A representation of the Tool Bar 10 as shown on a computer display's graphic user interface is shown in FIG. 1. The Tool Bar comprises the following elements:

1) Secure Email 12. The Tool Bar recruits new users each time a current user sends an encrypted email to a user who has not previously installed the Tool Bar. Aside from being extremely useful, the encrypted email functionality of the Tool Bar is effectively the means by which the Tool Bar spawns new users. New users do not need to have prior knowledge of the Tool Bar and the Tool Bar provider does not need to engage in a costly marketing process. Users are recruited virtually. A suitable secure email application for use in this invention is disclosed in U.S. patent application Ser. No. 11/621,080 filed Jan. 8, 2007 entitled "Method and System for Encrypted Email Communication" which is incorporated herein by reference.

2) Advertising Tile 14—The Tool Bar supports a "tile" (a rectangular area within the Tool Bar) that displays advertisements in text, graphic and video formats. A gray border around the tile, for example, might indicate that the tile has active content.

3) Media Tiles 16—The Tool Bar provides functions or "buttons" like other Tool Bars, but it also provides users with the ability to experience various kinds of Internet Media inside sections or "tiles" in the Tool Bar. These user configurable "tiles" provide users with a multi-media experience that improves the chances that a user will keep the Tool Bar activated on his/her desktop. A blue border around the tile, for example, might indicate that sound is coming from the tile. Pop-down menus 18 can be provided for each tile depending on the media type. In the example shown the user has selected CNN as a news channel. An "Add Media" button 20 can be provided to permit the user to add media buttons. Clicking on the button causes a pop down menu that prompts the user to select a media type, such as video, radio or RSS. When a new media tile type is added the tile queries the user to identify the channel of content to be displayed.

4) Multiple Applications—The Tool Bar is designed to be installed in a wide number of software applications, including:
   a. Microsoft Word, Outlook, Excel and Internet Explorer.
   b. Thunderbird and Fire Fox.
   c. And is also compatible with a wide number of web based email applications, such as GMail, Hotmail and Yahoo Mail.

Other functions will also be available in the Tool Bar, such as those found in conventional Tool Bars, such as search tools. The described Tool Bar is therefore an effective means of delivering advertisements to users while they work at their computer.

Secure Email

Figure 2:
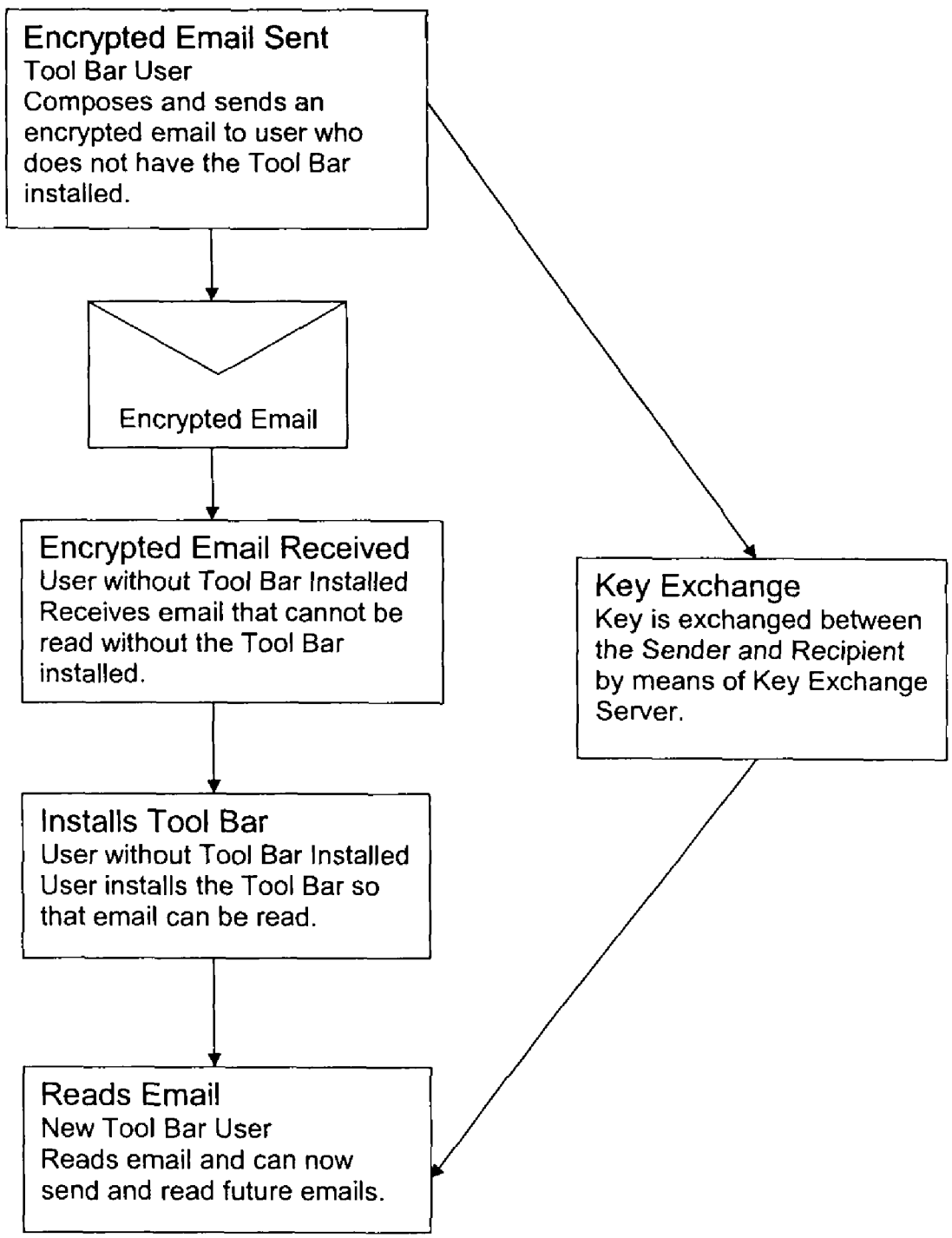
FIG. 2 is a flowchart illustrating the method of Secure Email Recruiting New Tool Bar User.

The commercial success of the Tool Bar depends upon the system having properties that: a) cause new users to install the Tool Bar and b) keep users from uninstalling the Tool Bar. This is made possible by means of a secure email (encrypted email) service that includes a key exchange server that is associated with the Tool Bar, as illustrated in FIG. 2. Several methods of sending secure email currently exist which would be suitable for use in this invention. A suitable secure email application for use in this invention is disclosed in U.S. patent application Ser. No. 11/621,080 filed Jan. 8, 2007 entitled "Method and System for Encrypted Email Communication" which is incorporated herein by reference.

The basic operation of the secure email is as follows (FIG. 2):

i) A button 12 on the Tool Bar 10 activates an email tool that permits the user to compose and encrypt an email using an encryption key.

ii) The encryption key is stored on a key exchange server.

iii) The encrypted email is sent to the email's intended recipient, who may not already have the Tool Bar installed. In order to decrypt the email the recipient requires installation of the Tool Bar. The recipient is prompted to download and install the Tool Bar in order to decrypt the email.

iv) Once the Tool Bar is installed the recipient is able to access the key exchange server to receive the encryption key.

v) The recipient's computer decrypts the email and the recipient can now send and read future emails using the system.

The secure email service thus creates a dependency in which the users can only send and receive encrypted (secure) emails if they have access to the key exchange server. Access to the key exchange server is dependent on having the Tool Bar installed by both the sender and the recipient of the email.

The secure email service thus produces two positive conditions:

Users who receive an encrypted email must install the Tool Bar to be able to read the email.

Users will lose the ongoing ability to send and receive encrypted emails if they uninstall the Tool Bar. Only users that use the Tool Bar can access emails that have been encrypted using the key exchange server and no other Tool Bar will work with the service.

In effect, the secure email is like a "Trojan Horse" that insures that the user will receive and maintain all of the other functions of the Tool Bar, including the Advertising Tile.

Advertising Tile

Figure 3:
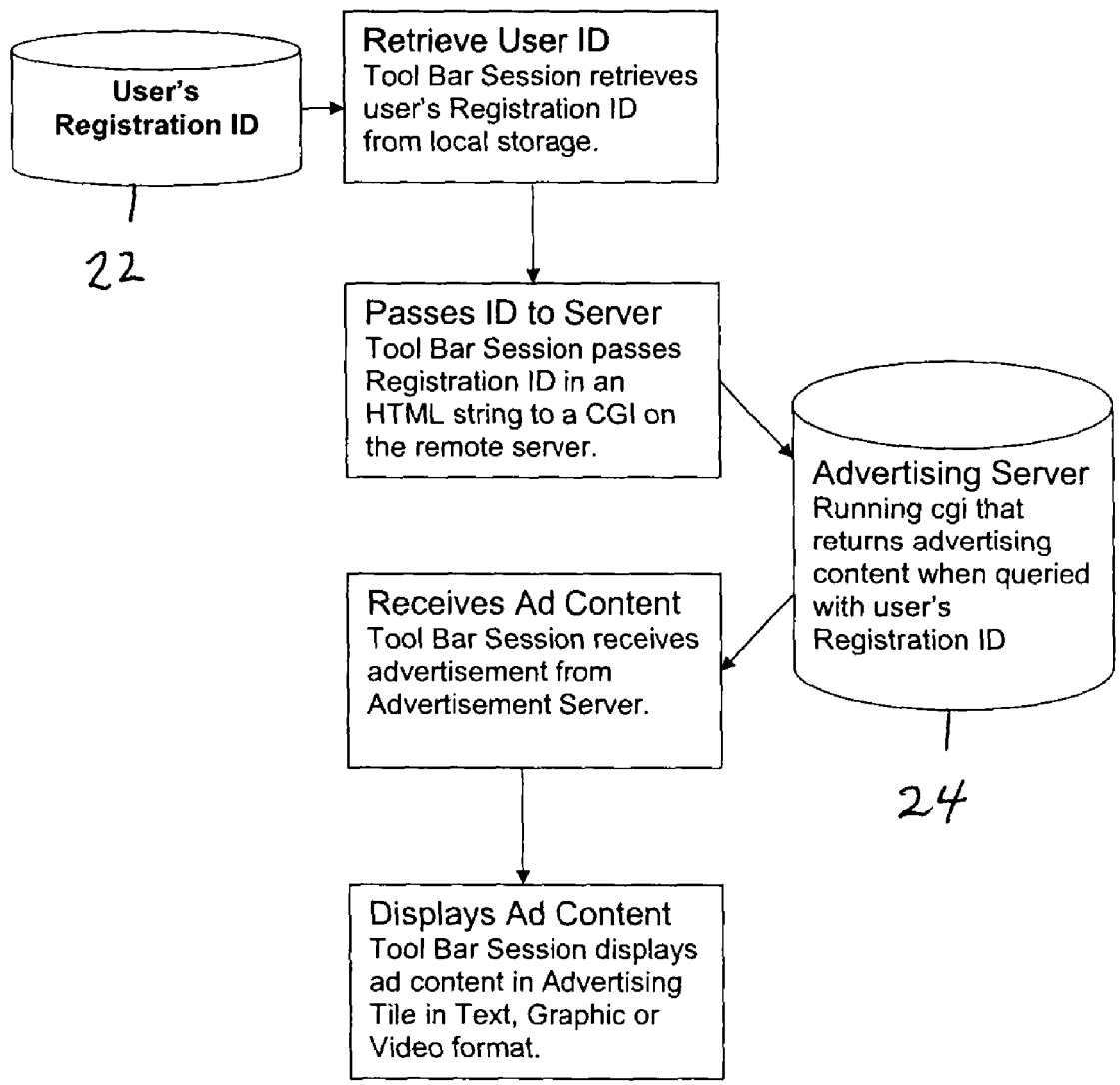
FIG. 3 is a flowchart illustrating Advertisements Placed in Tool Bar.

The Tool Bar contains a rectangular area 14 designed to display advertisements in text, graphic, Flash and video formats. This rectangular area is referred to herein as an Advertising Tile. The Advertising Tile 14 will allow the system to retrieve and display advertisements that are delivered from a remote server or from a local source on the user's computer. The advertisements will be retrieved from the remote server by means of a CGI (Common Gateway Interface) that will be executed by the Tool Bar, as illustrated in FIG. 3.

When the user downloads the Tool Bar for the first time, the user is given a Registration Identification number which is stored in the user's local storage 22. Each time the user activates the Tool Bar, the Tool Bar session retrieves the user's Registration ID from the local storage 22 and passes the Registration ID in an HTML string to a CGI on the system's remote advertising server 24. The advertising server runs a CGI that returns advertising content when queried with the user's Registration ID. The Tool Bar session receives the advertisement from the Advertisement server 24 and displays the advertising content in the Advertising Tile 14 in text, graphic or video format.

The Advertising Tile will contain advertisements designed to either create awareness of a product or to provide the user with a "clickable" area that leads to user to a website relevant to the advertisement. Furthermore, the advertisements displayed within the Tool Bar can be delivered based upon a profile of the user, created from information provided by the user or perhaps from tracking the user's on-line activity or purchases, enabling the system to deliver relevant ads to the user.

Media Tiles

Figure 4:
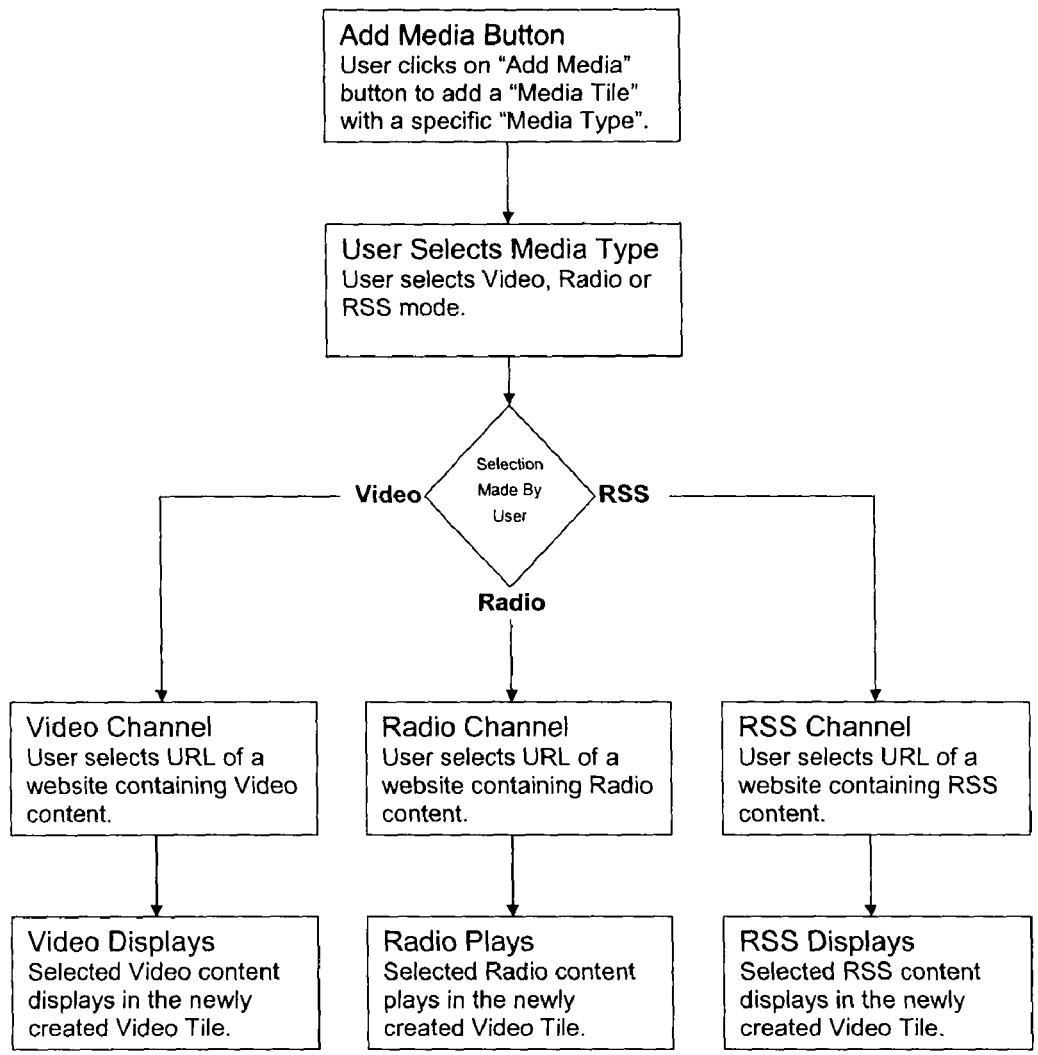
FIG. 4 is a flowchart illustrating Media Tiles.

A Media Tile 16 is a rectangular area of the Tool Bar that can contain Video, Internet Radio and RSS content, as illustrated in FIG. 1. The Tool Bar is equipped with an "Add Media" button 20 that allows the user to add Media Tiles 16. The process for adding a Media Tile is outlined in FIG. 4. Clicking on the button 20 causes a pop down menu that prompts the user to select a media type, such as video, radio or RSS. When a new media tile type is added the tile queries the user to identify the channel of content to be displayed and the user thereby selects the URL of the website for the selected channel. The content of the selected media is then displayed in the newly created tile.

Each "Media Tile" is assigned by a user and can be controlled in the following ways:

Size—The size of the tile can be controlled by clicking on a pop down menu that allows the user to select the "tile" size. In FIG. 1, the sizes are indicated by 100%, 200% and 300%.

Channel—The source of Video, Radio or RSS content can be controlled by the user by selecting from a pre-assigned list of sources or channels. New channels can be added by clicking on the "Add Channel" option.

Volume—The volume of sound being emitted by a Tile (where volume is relevant, as in Video and Radio) can be controlled by clicking on Volume Up, Volume Down and Mute.

Start and Stop—The user can start and stop media content by selecting the "Start" and "Stop" option.

Delete Media—The user can delete the Media Tile.

The Media functions of the Tool Bar will provide the user with additional benefits or reasons to keep the Tool Bar installed and continue to watch advertisements. Since the commercial success of the Tool Bar will depend upon users keeping the Tool Bar installed, the Media Tiles will be a critical component for most users.

Multiple Applications

The Tool Bar is designed to be installed in many common software applications, including: i) most email clients, such as Microsoft Outlook, Thunderbird and Netscape Mail; ii) most web-based email clients, such as GMail, Hotmail, Yahoo Mail, by means of a Tool Bar that can install in common web browsers, such as Internet Explorer and Firefox; iii) most Microsoft Office applications; iv) many other software applications.

The "Tile Manager"

Figure 5:
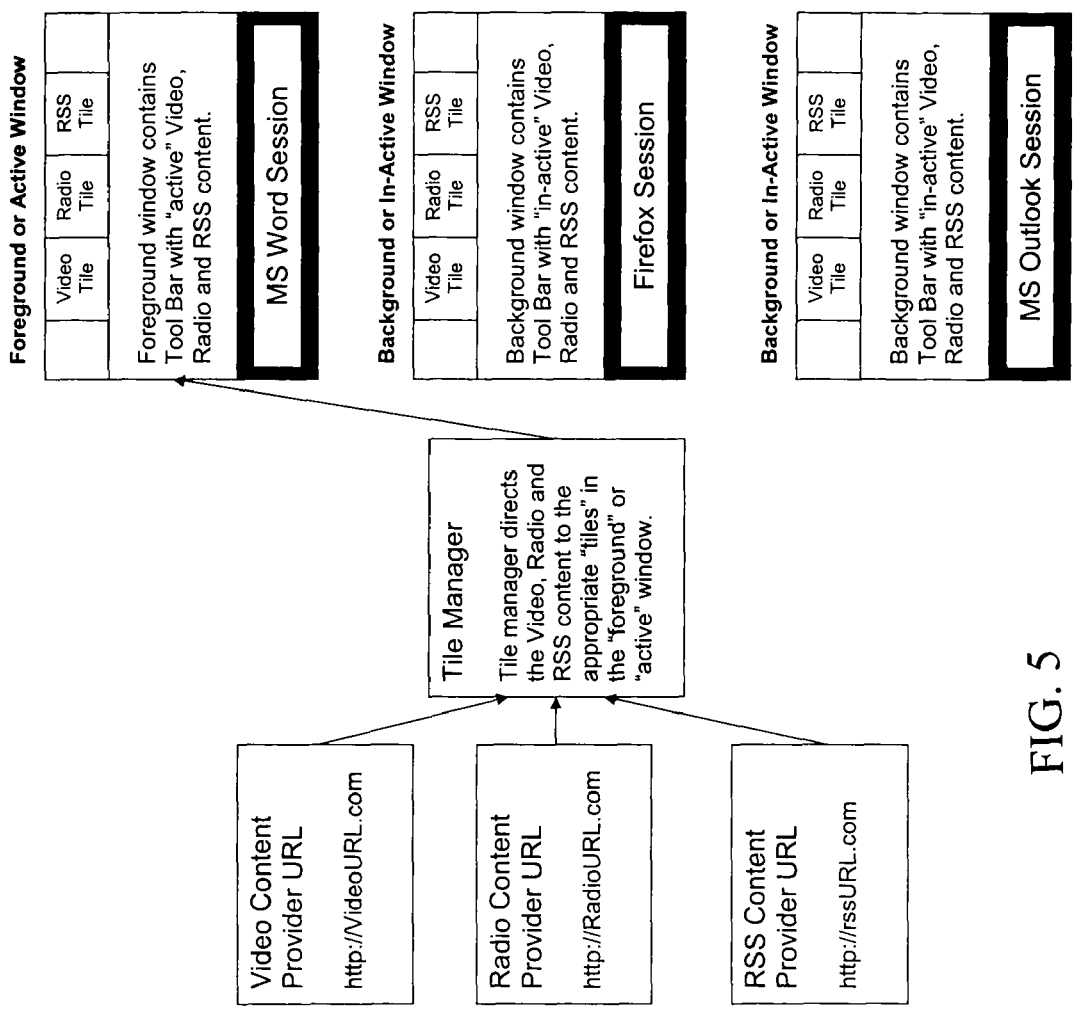
FIG. 5 is a schematic diagram illustrating the Tile Manager.

The Tool Bar is designed to continue to provide user access to media functions as the user moves from one application to another. A software program referred to herein as "Tile Manager", shown in FIG. 5, directs the Video, Radio and RSS content to the application running in the foreground "window". The Tile Manager keeps track of the "active" or "foreground" application on the user's desktop and tracks the position of the windows on the user's desktop. In the example shown in FIG. 5 the user has MS Word, Firefox and MS Outlook running on a desktop computer, where MS Word is the active or foreground application. The Tile Manager directs the video, radio and RSS content to the appropriate tiles in the foreground or active window, while the background windows contain the Tool Bar with in-active video, radio and RSS content.

Details of an embodiment of the Tile Manager are disclosed in co-pending U.S. provisional Patent application no. 60/972,335 filed Sep. 14, 2007 entitled "System for Managing Multi-Media Content Across Multiple Software Applications" which is incorporated herein by reference.

The Tile Manager displays Video and RSS content in the appropriate Tiles and in the appropriate locations on the screen. It provides user control for Video, Radio, RSS and other Tool Bar functions. For example, a user watching a video in one of the Tool Bar's Media Tiles can switch from sending an email in Microsoft Outlook to writing a document in MS Word while continuing to watch the video. In effect, the video that was playing in the Outlook session (while the Outlook session was the "foreground" application) continues to play in the MS Word session (when it becomes the "foreground" application). By giving the Tool Bar the ability to continuously control Video, RSS and Radio "tiles" as the user moves from application to application, the Tool Bar maintains a reason for the user to see advertisements in the Advertising Tile.

The key elements of the Tool Bar are therefore: a) Secure Email—central to the "propagation" of the Tool Bar, as new users receive Encrypted Emails that require the Tool Bar for decryption; b) Media—central to the retention of the Tool Bar by users, as a user will find the media functions entertaining; and c) Advertising—central to the business model for the Tool Bar, as advertisers will pay to display ads. Additional features can easily be added to the Tool Bar, to create further incentives to encourage users to keep the Tool Bar installed, such as Search—A tool that provides access to a search engine; or Instant Messaging—A tool that provides access to Instant Messaging, including the addition of Key Exchange services for the Instant Messages, making the messages "secure".

While a number of exemplary aspects and embodiments have been discussed above, those of skill in the art will recognize certain modifications, permutations, additions and sub-combinations thereof. It is therefore intended that the invention be interpreted to include all such modifications, permutations, additions and sub-combinations as are within its true spirit and scope.

What is claimed is:

1. A method of generating advertising revenue from advertisements displayed on users' computers, each user's computer having a computer display able to provide a graphical user interface, data storage and being accessible to the Internet, the method comprising:
   i) pushing a tool bar to the user's interface by an action that is not initiated by the user;
   ii) assigning a first-time user a unique identification;
   iii) storing said unique identification in said data storage of said first-time user's computer;
   iv) storing a user profile including information provided by the user or other data captured about the user's prior behaviour in association with said unique identification;
   v) each subsequent time said first-time user activates said tool bar, retrieving said first-time user's unique identification from said data storage and passing said unique identification to a Common Gateway Interface (CGI) on an advertising server;
   vi) said advertising server running a CGI that returns advertising content to said tool bar in response to said unique identification and said associated user profile;
   vii) said toolbar displaying said advertising content; and
   viii) providing an incentive to maintain the tool bar on the user's interface;
   wherein said tool bar is adapted to communicate advertisements.

2. The method of claim 1 wherein said action that is not initiated by the user is the sending of a message to said user and said message includes a message instructing unregistered recipients how to register with the system.

3. The method of claim 2 wherein said tool bar is adapted to display advertisements by providing a plurality of areas of the tool bar which display text, graphics or video.

4. The method of claim 1 wherein said incentive is a selection of multi-media information and entertainment services which may be selected by the user for viewing.

5. The method of claim 4 wherein said tool bar is adapted to display said multi-media information and entertainment services by providing at least one area of the tool bar which displays text, graphics or video.

6. The method of claim 5 wherein said tool bar is adapted to display said multi-media information and entertainment services by providing a plurality of areas of the tool bar which display text, graphics or video.

7. The method of claim 5 wherein said tool bar permits said user to view, hear or interact with multi-media information.

8. The method of claim 4 wherein said advertisements are delivered from a remote server or from a local source on the user's computer.

9. The method of claim 8 wherein said advertisements are delivered from a remote server by means of a CGI (Common Gateway Interface) that is executed by the tool bar.

10. The method of claim 5 wherein said user can install the tool bar in a plurality of application programs.

11. The method of claim 10 wherein the multi-media information and entertainment services which may be selected by the user for viewing can be continuously viewed on said tool bar as the user moves between said applications.

12. A computer readable storage medium having program code stored thereon, wherein the program code, when executed by a computer, performs the method of claim 1.

13. A computer readable storage medium having program code stored thereon, wherein the program code, when executed by a computer, performs the method of claim 4.

* * * * *